(12) United States Patent
Tokita et al.

(10) Patent No.: US 8,194,073 B2
(45) Date of Patent: Jun. 5, 2012

(54) IMAGE GENERATION APPARATUS, IMAGE GENERATION PROGRAM, MEDIUM THAT RECORDS THE PROGRAM, AND IMAGE GENERATION METHOD

(75) Inventors: Takashi Tokita, Tokyo (JP); Tomoya Asano, Tokyo (JP); Yosuke Tomita, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 49 days.

(21) Appl. No.: 12/745,119

(22) PCT Filed: Nov. 25, 2008

(86) PCT No.: PCT/JP2008/003448
§ 371 (c)(1),
(2), (4) Date: Jun. 24, 2010

(87) PCT Pub. No.: WO2009/069278
PCT Pub. Date: Jun. 4, 2009

(65) Prior Publication Data
US 2010/0302239 A1  Dec. 2, 2010

(30) Foreign Application Priority Data
Nov. 30, 2007  (JP) .................................. 2007-309832

(51) Int. Cl.
*G06T 15/10* (2011.01)
*G06T 15/20* (2011.01)
(52) U.S. Cl. .......................... 345/427; 345/419; 345/420
(58) Field of Classification Search .......................... None
See application file for complete search history.

(56) References Cited

U.S. PATENT DOCUMENTS
6,078,329 A  6/2000  Umeki et al.
6,561,907 B2  5/2003  Shimizu et al.
(Continued)

FOREIGN PATENT DOCUMENTS
JP  2004-253009  9/2004
(Continued)

OTHER PUBLICATIONS

Japanese Office Action in corresponding Japanese Patent Application No. 2007-309832 dated Jul. 7, 2010 and issued on Jul. 20, 2010.

(Continued)

*Primary Examiner* — Said Broome
(74) *Attorney, Agent, or Firm* — Greenblum & Bernstein, P.L.C.

(57) ABSTRACT

It is an object of the present invention to move a viewpoint position and a direction of a line of sight a player character with an intuitive operation method without requiring pre-study. In a case where a player touches a point within a movement determination region, a virtual 3D spatial image moved forward in the direction of the line of sight is displayed. In a case where a player touches a point at the left side outside the movement determination region, a virtual 3D spatial image as viewed by a virtual camera panned to the left is displayed, whereas in a case where a player touches a point at the right side, a virtual 3D spatial image as viewed by a virtual camera panned to the right is displayed. Furthermore, in a case where a player touches an upper point, a virtual 3D spatial image as viewed by a virtual camera tilted in the upper direction is displayed, whereas in a case where a player touches a lower point, a virtual 3D spatial image as viewed by a virtual camera tilted in the lower direction is displayed.

20 Claims, 6 Drawing Sheets

U.S. PATENT DOCUMENTS

| | | |
|---|---|---|
| 2004/0176164 A1 | 9/2004 | Kobayashi |
| 2005/0168449 A1 | 8/2005 | Katayose |
| 2005/0187015 A1 | 8/2005 | Suzuki et al. |
| 2007/0097116 A1 | 5/2007 | Ito et al. |
| 2008/0207323 A1 | 8/2008 | Hiroshige et al. |
| 2008/0207324 A1 | 8/2008 | Hiroshige et al. |

FOREIGN PATENT DOCUMENTS

| | | |
|---|---|---|
| JP | 2004-283521 | 10/2004 |
| JP | 2005-186847 | 7/2005 |
| JP | 2005-230263 | 9/2005 |
| JP | 2005-267006 | 9/2005 |
| JP | 2006-65888 | 3/2006 |
| JP | 2006-065888 | 3/2006 |
| JP | 2007-087324 | 4/2007 |
| JP | 2007-128158 | 5/2007 |

OTHER PUBLICATIONS

Japanese Office Action in corresponding Japanese Patent Application No. 2007-309832 dated Oct. 12, 2010 and issued on Oct. 19, 2010.

| | 2D coordinate | 3D coordinate | Gaze direction |
|---|---|---|---|
| Touch position | (xt,yt) | (Xt,Yt,Zt) | |
| Virtual camera | (xc,yc) | (Xc,Yc,Zc) | L |

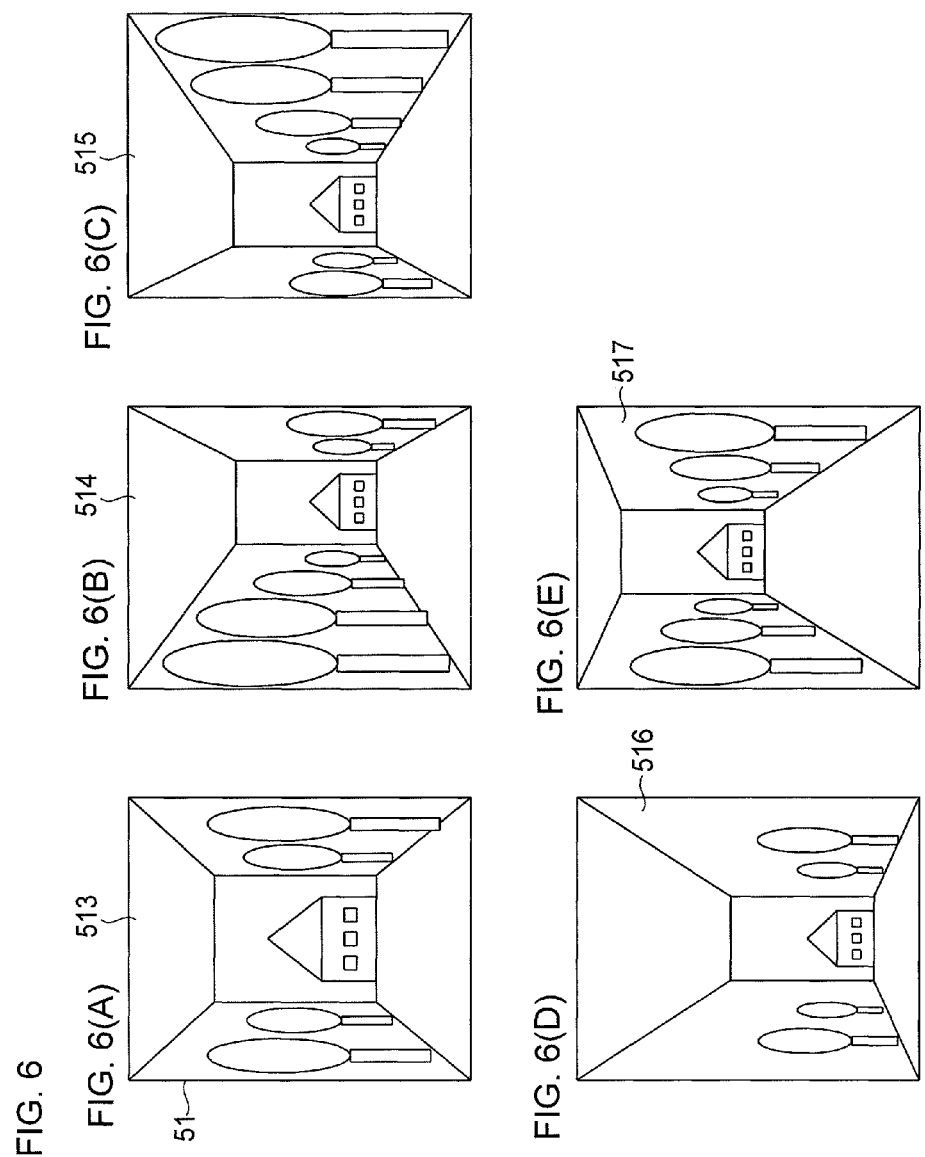

US 8,194,073 B2

IMAGE GENERATION APPARATUS, IMAGE GENERATION PROGRAM, MEDIUM THAT RECORDS THE PROGRAM, AND IMAGE GENERATION METHOD

TECHNICAL FIELD

The present invention relates to an image generation apparatus that generates and displays an image from a first-person viewpoint, and an image generation program, an image generation program recording medium, and an image generation method used in the image generation apparatus.

BACKGROUND ART

A game apparatus that shows state of a virtual 3D space from a player's viewpoint (first-person viewpoint) on its screen is already known in the art (See Patent Document 1, for example). Meanwhile, a portable game apparatus with a touch panel is already practically available.

Patent Document 1: Japanese Laid-Open Patent Application No. 2004-283521

DISCLOSURE OF THE INVENTION

Problem to be Solved by the Invention

The above game apparatus has a touch panel and a plurality of switch buttons. The examples of such switch buttons are a button for instructing the movement direction of a player character, a button for instructing commands or motions, and a button for moving the viewpoint position of a virtual camera. A player has to study how to operate various button switches and a touch panel by reading a manual to play game and thus pre-study is necessary.

The present invention is made in light of such a conventional problem. It is an object of the present invention to provide an image generation apparatus that can move the viewpoint position and the direction of a line of sight of the virtual camera with an intuitive operation without requiring a player to study in advance, and an image generation program, and an image generation program recording medium.

Means for Solving Problem

In order to solve the above problem, the image generation apparatus as claimed in claim 1 sets a virtual camera at a viewpoint position of a player character in a virtual three-dimensional space where at least one object including the player character is set and the player character moves in accordance with a user's operation of an inputter. The apparatus generates a virtual three-dimensional spatial image viewed from the virtual camera in a predefined direction of a line of sight to display the three-dimensional spatial image on a screen. The apparatus comprises:

a touch position detector that detects a touched position on the screen per frame;

a determiner that determines whether the touched position detected by the touched position detector is within a predefined region on the screen;

a first controller that moves the virtual camera along the direction of the line of sight in the virtual three-dimensional space in a case where the touched position is determined to be within the predefined region by the determiner; and a second controller that rotates the direction of the line of sight depending on the touched position in the virtual three-dimensional space in a case where the touched position is determined to be outside the predefined region by the determiner.

Furthermore, the image generation apparatus as claimed in claim 2 is characterized in that the first controller determines movement amount based on a preset coefficient depending on a kind of place and/or a situation where the player character is located and moves the virtual camera along the direction of the line of sight by the determined movement amount.

Furthermore, the image generation apparatus as claimed in claim 3 is characterized in that the second controller further comprises:

a detector that detects a distance on the screen from a center point of the predefined region to the touched position detected by the touch position detector; and a rotation angle controller that controls a rotation angle of the virtual camera depending on the distance detected by the detector.

Furthermore, the image generation apparatus as claimed in claim 4 is characterized in that the predefined region is a central region of the screen.

Furthermore, the image generation apparatus as claimed in 5 is characterized in that the predefined region is the central region of the screen and is the circular region.

Furthermore, the image generation apparatus as claimed in claim 6 is characterized in that the determinator determines whether a time period of the touch on the screen detected by the touch detector is more than a predefined time period, and, in a case where the time period of the touch is more than the predefined time period, determines whether the touched position is within the predefined region on the screen.

Furthermore, the image generation program as claimed in claim 7 is characterized in that the program causes a computer of an image generation apparatus, the image generation apparatus setting a virtual executed by a computer of an image generation apparatus that sets a virtual camera at a viewpoint position of a player character in a virtual three-dimensional space where at least one object including the player character is set and the player character moves in accordance with a user's operation of an inputter, and generates a virtual three-dimensional spatial image viewed from the virtual camera in a predefined direction of a line of sight to display the three-dimensional spatial image on a screen, the program causing the computer to function as:

a touch position detector that detects a touched position on the screen per frame;

a determiner that determines whether the touched position detected by the touch position detector is within a predefined region on the screen;

a first controller that moves the virtual camera along the direction of the line of sight in the virtual three-dimensional space in a case where the touched position is determined to be within the predefined region by the determiner; and a second controller that rotates the direction of the line of sight depending on the touched position in the virtual three-dimensional space in a case where the touched position is determined to be outside the predefined region by the determiner.

Furthermore, computer readable medium that stores an image generation program as claimed in claim 8 is characterized in that the program program is executed by a computer of an image generation apparatus that sets a virtual camera at a viewpoint position of a player character in a virtual three-dimensional space where at least one object including the player character is set and the player character moves in accordance with a user's operation of an inputter, and generates a virtual three-dimensional spatial image viewed from the virtual camera in a predefined direction of a line of sight to display the three-dimensional spatial image on a screen, the program causing the computer to function as:

a touch position detector that detects a touched position on the screen per frame;

a determiner that determines whether the touched position detected by the touched position detector is within a predefined region on the screen;

a first controller that moves the virtual camera along the direction of the line of sight in the virtual three-dimensional space in a case where the touched position is determined to be within the predefined region by the determiner; and a second controller that rotates the direction of the line of sight depending on the touched position in the virtual three-dimensional space in a case where the touched position is determined to be outside the predefined region by the determiner.

Furthermore, the image generation method as claimed in claim 9 is characterized in that method sets a virtual camera at a viewpoint position of a player character in a virtual three-dimensional space where at least one object including the player character is set and the player character moves in accordance with a user's operation of an inputter, and generates a virtual three-dimensional spatial image viewed from the virtual camera in a predefined direction of a line of sight to display the three-dimensional spatial image on a screen, the method comprising:

a touch position detection step for detecting a touched position on the screen per frame;

a determination step for determining whether the touched position detected by the touch position detection step is within a predefined region on the screen;

a first control step for moving the virtual camera along the direction of the line of sight in the virtual three-dimensional space in a case where the touched position is determined to be within the predefined region by the determination step; and a second control step for rotating the direction of the line of sight depending on the touched position in the virtual three-dimensional space in a case where the touched position is determined to be outside the predefined region by the determination step.

Effect of the Invention

According to the present invention, a user can move the viewpoint and direction of a line of sight of a virtual camera placed in the viewpoint of a player character in a virtual 3D space with an intuitive operating method without requiring pre-study.

BEST MODE FOR CARRYING OUT THE INVENTION

Hereinafter, one embodiment of the present invention will be described with reference to figures. FIG. 1 is a block diagram that illustrates an example of a configuration of a game apparatus 100 according to one embodiment of the present invention. The game apparatus 100 is provided with a portable body 10 on which each element of the apparatus is mounted.

The surface part of the machine body 10 has a display 50 and an operation input part 21. The display 50 has a plurality of image display parts, an upper image display part 51 and a lower image display part 52. The operation input part 21 is composed of switches and keys such as a power switch and a cross key.

The circuit placed in the machine body 10 includes a control part 11, a RAM 12, a hard disc drive (HDD) 13, a sound processing part 14, a graphics processing part 15, a communication interface 17, an interface part 18, a frame memory 19, and a card slot 20. The control part 11, the RAM 12, the hard disc drive (HDD) 13, the sound processing part 14, the graphics processing part 15, the communication interface 17, and the interface part 18 are each connected to an internal bus 22.

The control part 11, including a CPU, a ROM, etc., controls the entire game apparatus 100 in accordance with the control program stored in the HDD 13 or a recording medium 70. The control device 11 is provided with an internal timer which is used, for example, to generate timer interrupts. The RAM 12 is also used as a working area for the control part 11.

The sound processing part 14, provided with a sound input/output interface function that performs D/A and A/D conversion of sound signals, is connected to a sound output apparatus 30 composed, for example, of a speaker. The sound processing part 14 outputs sound signals to the sound output apparatus 30 in accordance with the sound output instructions from the control part 11 that executes processes in accordance with various control programs.

The graphics processing part 15 is connected to the display 50 that has the upper image display part 51 and the lower image display part 52. The graphics processing part 15 distributes images to the frame memory 19 in accordance with the drawing instructions from the control part 11 and also outputs video signals that display the images on the upper and lower image display parts 51 and 52 to the display 50. The switching time for the images displayed according to the video signals is set to 1/30 seconds per frame, for example.

The recording medium 70 stored with programs etc. is inserted into the card slot 20. The recording medium 70 in the present embodiment is a semiconductor memory such as a writable flash memory. The communication interface 17 is connectable to another game apparatus 100 wired or wirelessly, and also is connectable to a communication network such as the Internet. The machine body 10 can communicate with another game apparatus 100 using the communication function of the communication interface 17.

The operation input part 21, the card slot 20 and a touch panel 40 are connected to the interface part 18. The interface part 18 stores, on the RAM 12, the instruction data from the operation input part 21 based on the player's (user's) operation and the instruction data based on the player's operation of the touch panel 40 using a touch pen 41 etc. Then, the control unit 11 executes various arithmetic processing in accordance with the instruction data stored in the RAM 12.

The touch panel 40 is stacked on the display screen(s) of both or either of the upper and lower image display parts 51 and 52. Therefore, the control part 11 recognizes input information depending on the operation inputs by a player, by managing/controlling the timing of display of both or either of the upper and lower image display parts 51 and 52 where the touch panel 40 is stacked, and the timing and position coordinates of operation of the touch panel 40 using the touch pen 41 etc. The display 50 may be configured with a display screen having a single image display part instead of having a plurality of image display parts such as the upper and lower image display parts 51 and 52.

The interface part 18 executes the processes, in accordance with the instructions from the control part 11, such as storing the data that shows the progress of the game stored in the RAM 12 in the recording medium 70 which is inserted into the card slot 20, or reading out the game data at the time of interruption stored in the recording medium 70 and transferring the data to the RAM 12.

Various data such as a control program for playing a game on the game apparatus 100 is stored in the recording medium 70. The various data such as a control program stored in the recording medium 70 is read out by the control part 11 through the card slot 20 where the recording medium 70 is inserted and is loaded into the RAM 12.

The control part 11 executes various processes, in accordance with the control program loaded into the RAM 12, such as outputting drawing instructions to the graphics processing part 15, or outputting sound output instructions to the sound processing part 14. While the control part 11 is executing the processing, the data occurring intermediately depending on the game progress is stored in the RAM 12 used as a working memory.

As described above, the game apparatus 100 has the upper image display part 51 and the lower image display part 52. However, in the present embodiment, the game apparatus 100 displays a virtual 3D space image 511 that constitutes a game only with the use of the upper image display part 51 as shown in FIG. 2. Further, in the center of the upper image display part 51 is set a movement determination region 512 which is a circular predefined region.

The above recording medium 70 stores a program that executes the process shown in the flow chart described below together with a coordinate data table 71 shown in FIG. 3. The coordinate data table 71 stores a 2D coordinate (xp, yp) and a 3D coordinate (Xp, Yp, Zp) of a viewpoint position P of a virtual camera and a direction (vector) of a line of sight L. That is, the position of a player character serves as the viewpoint position P of the virtual camera, and the direction of the line of sight of the player character serves as the line of sight L direction of the virtual camera.

Furthermore, the above coordinate data table 71, as shown in FIG. 3, renews and stores a 2D coordinate (xt, yt) that indicates the touched position on the upper image display part 51 detected by the touch panel 40 and a 3D coordinate (Xt, Yt, Zt) in the virtual 3D space corresponding to the 2D coordinate (xt, yt), at every frames.

FIG. 4 is a figure that illustrates the relation among the viewpoint of a virtual camera, the position of a character in a virtual 3D space, and the direction of the line of sight of the virtual camera. In the figure, P indicates the viewpoint position (Xp, Yp, Zp) of the virtual camera and L indicates the direction (vector) of the line of sight of the virtual camera as described above.

Next, the procedures according to the present embodiment are explained with reference to the flow chart shown in FIG. 5. The following processes are executed by the control part 11 that controls other components within the game apparatus 100 based on the game programs stored in the recording medium 70. Namely, if the upper image display part 51 is touched by the touch pen 41 while the initial screen etc. shown in FIG. 2 are displayed on the upper image display part 51, the control part 11 executes a player movement process in line with the flow chart of a main routine.

First, the touched coordinate (2D coordinate) detected by the touch panel 40 is detected (Step S1). Next, it is determined whether or not the continuous touch time detected at step S1 is more than a predefined time period (e.g., over a second) (Step S2). In a case where the detected touch continuous time is less than the predefined time period, the processing in accordance with the subject flow chart is ended. In a case where the continuous touch time is more than the predefined time period, it is determined whether or not the coordinate (2D coordinate (xt, yt)) of the touched position detected at Step S1 is within the movement determination region 512 (Step S3).

In a case where the coordinate (xt, yt) of the touched position is within the movement determination region 512, the 3D coordinate of the virtual camera C stored in the coordinate data table 71 is updated to the coordinate moved by a predefined amount in the line of sight L direction (Step S4).

Namely, the 3D coordinate (Xp, Yp, Zp) that shows the current position of the virtual camera C and the direction of the line of sight L are stored in the coordinate data table 71 as shown in FIG. 3. Therefore, the 3D coordinate (Xp1, Yp1, Zp1) when the virtual camera C is moved by the predefined amount along the line of sight L direction can be calculated based on the current position coordinate (Xc, Yc, Zc) of the virtual camera, and the calculated 3D coordinate (Xp1, Yp1, Zp1) is stored in the coordinate data table 71 as a new 3D coordinate of the virtual camera C. At that time, the movement amount is determined based on a preset coefficient depending on the kind of places (e.g., stairs or corridor) where a player character is located and its situation (e.g., run or walk).

Subsequently, the virtual camera C is moved to the updated 3D coordinate (Xp1, Yp1, Zp1) (Step S5). Then, a virtual 3D spatial image as viewed by the moved virtual camera C in the direction of the line of sight L is generated (Step S6), and the generated virtual 3D spatial image is displayed on the upper image display part 51 to update the displayed image (Step S7).

Accordingly, in a case where a player touches a position within the movement determination region 512 with the touch pen 41 for more than predefined time period as shown by (A) in FIG. 2 while the virtual 3D spatial image 511 is being displayed, a virtual 3D spatial image 513 as viewed by the virtual camera C moved forward is displayed on the upper image display part 51 as shown in FIG. 6(A).

In a case where the touch coordinate is not within the movement determination region 512 as a result of determination at Step S3, the 2D coordinate of the touched position stored in the coordinate data table 71 is updated to the coordinate (xt2, yt2) of the touched position detected at the foregoing Step S1, and the 3D coordinate (Xt2, Yt2, Zt2) of the touched position is also updated based on the updated 2D coordinate of the touched position (Step S8).

Subsequently, the direction of the line of sight is rotated with respect to the x-axis and the y-axis based on the updated 2D coordinate (Xt2, Yt2) of the touched position. More specifically, first, the 2D distance on the upper image display part 51 from the central coordinate of the movement determination region 512 to the touched position, namely, the respective differences of x- and y-coordinates are calculated (Step S9). Then, the movement amounts in the x- and y-coordinates are calculated by multiplying these differences by a predefined coefficient, and the line of sight L direction is rotated based on the calculated values of the movement amounts (Step S10).

Thereafter, at the foregoing Step S6, the virtual 3D spatial image as viewed by the virtual camera C with the direction of the line of sight L rotated at the foregoing Step S9 is generated. Then, the generated virtual 3D spatial image is displayed on the upper image display part 51 to update the displayed image (Step S7).

As the processes ranging from the detection of the touch coordinate (xt2, yt2) to the rotational movement of the direction of the line of sight L are executed per frame, continuously touching the upper image display part allows the rotational process to be executed at a rate (speed) proportional to a distance from the center of the movement determination region 512.

Therefore, in a case where a player touches the left point (B) outside the movement determination region 512 on the upper image display part 51 with the touch pen 41 for more than a predefined time period while the virtual 3D spatial image 511 is being displayed as shown in FIG. 2, the direction of the line of sight L of the virtual camera C is rotationally moved in the direction of the left point (B) of the upper image display part 51. As a result, a virtual 3D spatial image 514 as viewed by the virtual camera C panned to the left is displayed on the upper image display part 51 as shown in FIG. 6(B).

In a case where a player touches the right point (C) outside the movement determination region 512 on the upper image display part 51 with the touch pen 41 for more than the predefined time period while the virtual 3D spatial image 511 is being displayed as shown in FIG. 2, the direction of the line of sight L of the virtual camera C is rotationally moved in the direction of the right point (C) of the upper image display part 51. As a result, a virtual 3D spatial image 515 as seen by the virtual camera C panned to the right is displayed on the upper image display part 51 as shown in FIG. 6(C).

In a case where a player touches the upper point (D) outside the movement determination region 512 on the upper image display part 51 with the touch pen 41 for more than the predefined time period while the virtual 3D spatial image 511 is being displayed as shown in FIG. 2, the direction of the line of sight L of the virtual camera C is rotationally moved in the direction of the upper point (D) of the upper image display part 51. As a result, a virtual 3D spatial image 516 as seen by the virtual camera C tilted upward is displayed on the upper image display part 51 as shown in FIG. 6(D).

If a player touches the lower point (E) outside the movement determination region 512 on the upper image display part 51 with the touch pen 41 for more than the predefined time period while the virtual 3D spatial image 511 is being displayed as shown in FIG. 2, the direction of the line of sight L of the virtual camera C is rotationally moved in the direction of the lower point (E) of the upper image display part 51. As a result, a virtual 3D spatial image 517 as viewed by the virtual camera C tilted downward is displayed on the upper image display part 51 as shown in FIG. 6(E).

The above-described processes of the detection of a touched position and the rotational movement of the viewpoint position P and the direction of the line of sight L based on the detected touch coordinate enable seamless processes of moving a viewpoint position (namely, a player character) and rotating the direction of the line of sight while the screen is touched.

Therefore, the position and the direction of the line of sight of the virtual camera C placed in the viewpoint position of a player character in a virtual 3D space can be moved with an intuitive operation method without requiring user's pre-study, and, in addition, a virtual 3D spatial image according to the subject movement can be displayed.

The movement determination region 512 of this embodiment is described as being circular. However, the shape of the movement determination region 512 may be changed to move the virtual camera C more naturally in an image part such as stairs where a floor is determined to be sloping (oblique). In a case where a player character descends the stairs, for example, the center of the movement determination region may be moved downward (alternatively, the region may be a downwardly-elongated ellipse) to allow a player to touch the direction naturally where the player character is actually moving.

The present embodiment ends processing in a case where the determination at Step S2 is "NO" and the continuous touch time is less than the predefined time period. However, in a case where the determination at Step S2 is "NO" in such a game where a player can select an object, a selection process of selecting the touched object may be executed. This makes it possible to execute the viewpoint position process and the object selection process depending on the difference in continuous touch time.

The above embodiment is explained using a game apparatus 100 as an example. However, the present invention can be applied to various kinds of portable equipment such as a personal computer and a cellular phone unit that has an image generation function.

The game data (various data such as a control program used in game) that allows the machine body 10 to execute the above-described various processes is explained to be stored in the recording medium 70. However, such game data may be distributed through a server machine such as a WWW server. In this case, the machine body 10 may obtain the game data distributed through the server machine via a communication network and store it in the HDD 13, and use the game data by loading it from the HDD 13 into the RAM 12.

BRIEF DESCRIPTION OF THE DRAWINGS

FIG. 3 is a pattern diagram for illustrating a coordinate data table.

FIG. 6 is a display transition diagram of the present embodiment.

EXPLANATION OF NUMERALS

Figure 1:
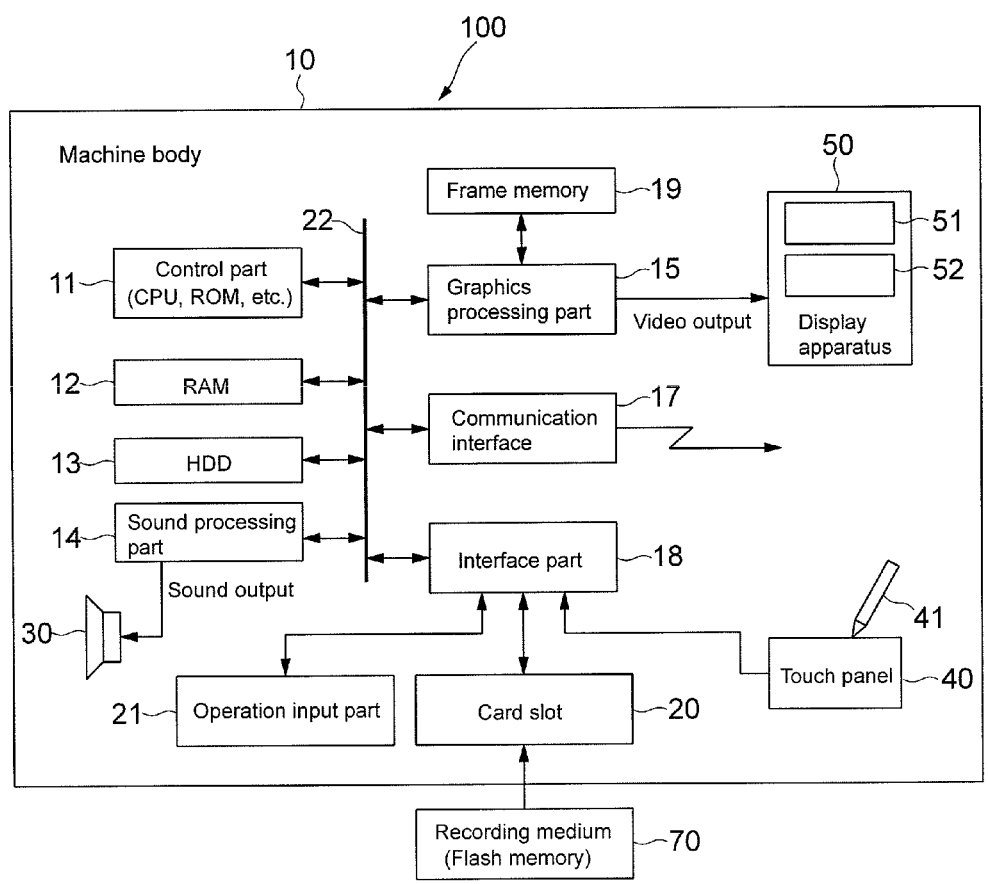
FIG. 1 is a block diagram for illustrating a configuration example of a game apparatus 100 according to one embodiment of the present invention.
Figure 2:
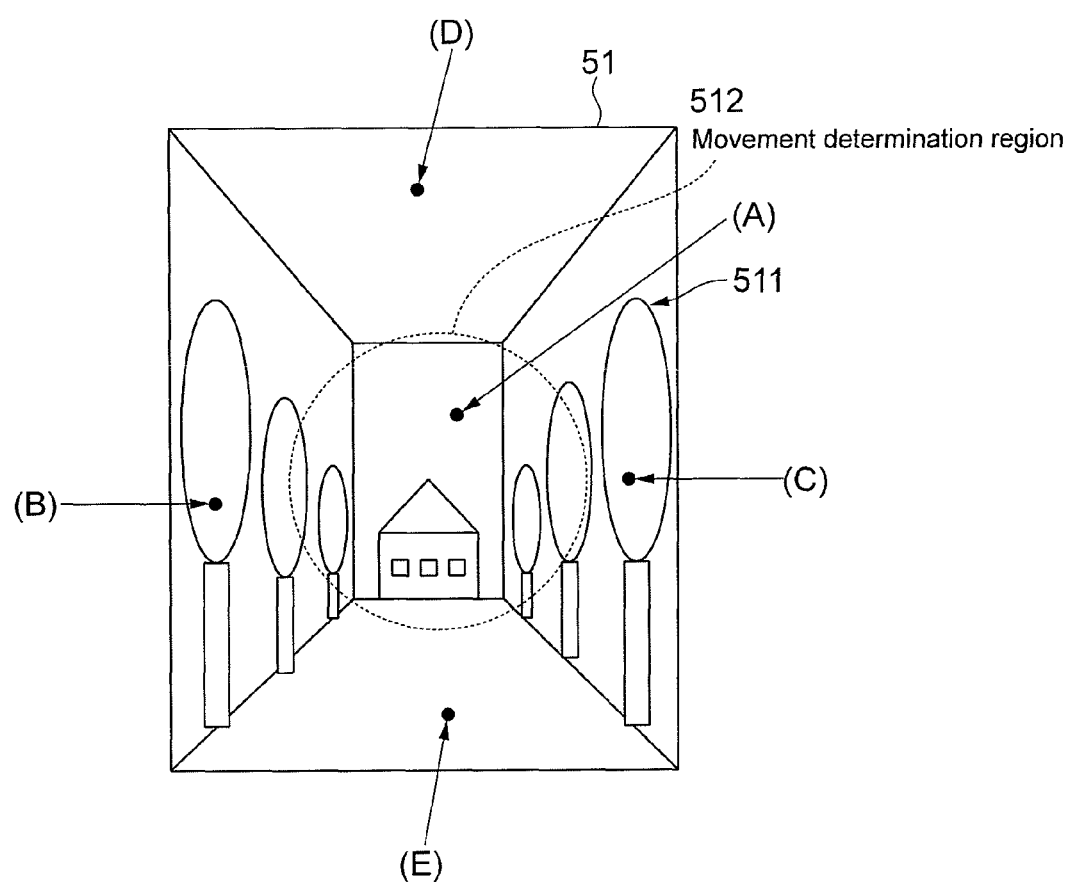
FIG. 2 is a diagram for illustrating an example of an initial screen.
Figure 4:
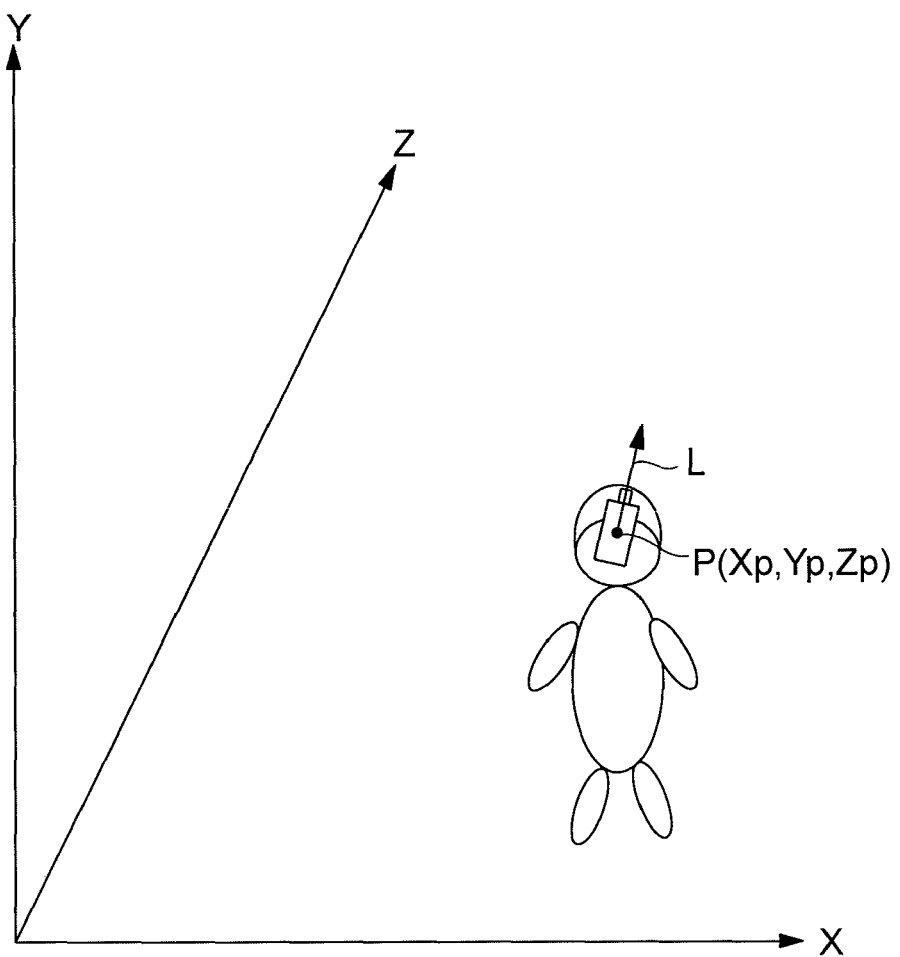
FIG. 4 is a figure for illustrating one example of a virtual 3D space.
Figure 5:
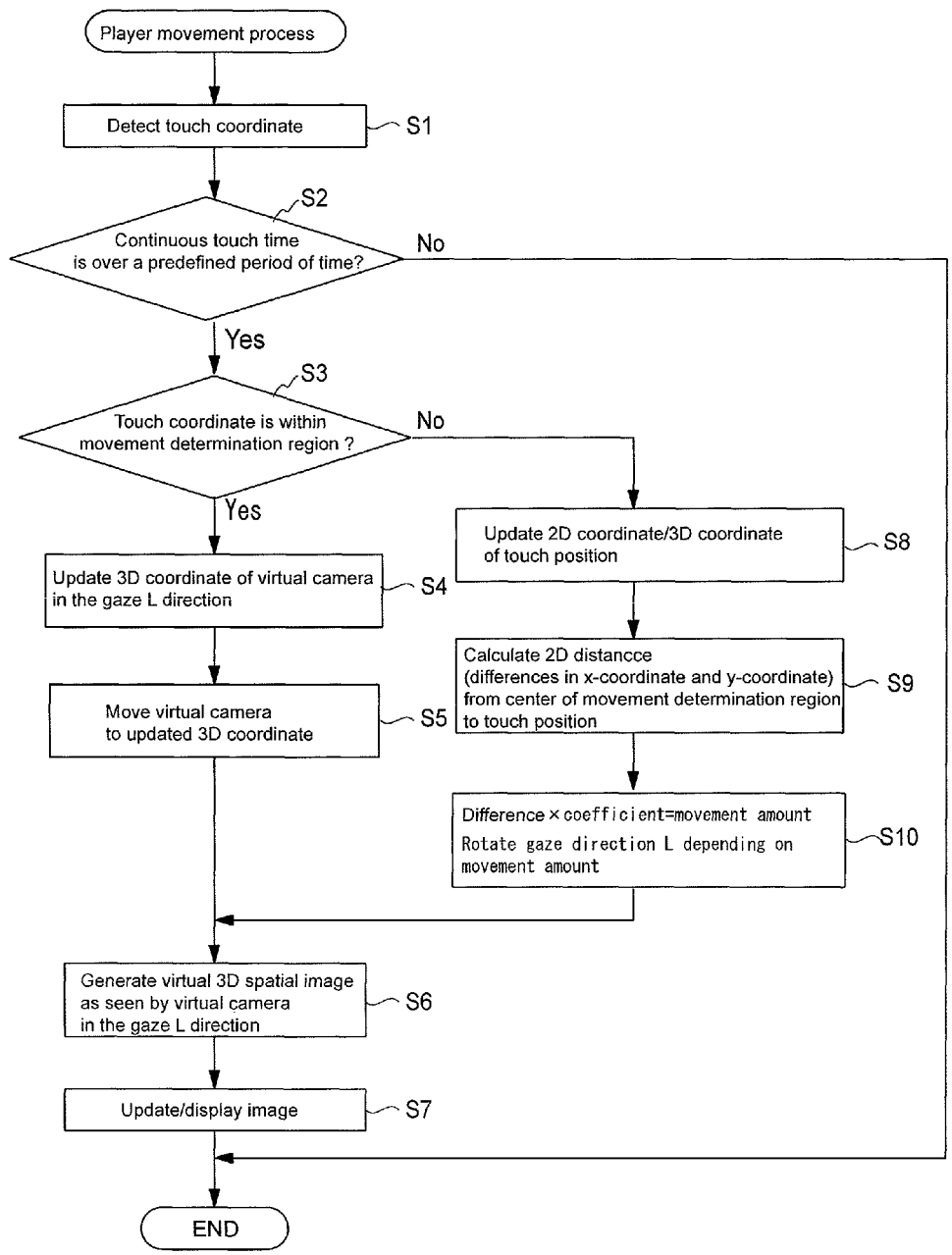
FIG. 5 is a flow chart for illustrating procedures of the present embodiment.

10 Machine body
11 Control part
12 RAM
13 HDD
14 Sound processing part
15 Graphics processing part
17 Communication interface
18 Interface part
19 Frame memory
20 Card slot
21 Operation input part
22 Internal bus
30 Sound output apparatus
40 Touch panel
41 Touch pen
50 Display
51 Upper image display part
52 Lower image display part
70 Recording medium
71 Coordinate data table
100 Game apparatus
C Virtual camera
L Line of Sight
P Viewpoint position

The invention claimed is:

1. An image generation apparatus that sets a virtual camera at a viewpoint position of a player character in a virtual three-dimensional space where at least one object, including the player character, is set and the player character moves in accordance with a user's operation of an inputter, and generates a virtual three-dimensional spatial image viewed from the virtual camera in a predefined direction of a line of sight to display the three-dimensional spatial image on a screen of a touch panel, the image generation apparatus comprising:
   a touch position detector that detects, with a processor and via an interface, a touched position on the screen of the touch panel per frame;
   a determiner that determines, with the processor, whether the touched position, detected by the touched position detector, is within a predefined region on the screen of the touch panel;
   a first controller that moves, by the processor, the virtual camera along the predefined direction of the line of sight in the virtual three-dimensional space when the touched position is determined to be within the predefined region by the determiner; and
   a second controller that rotates, by the processor, the predefined direction of the line of sight depending on the touched position in the virtual three-dimensional space when the touched position is determined to be outside the predefined region by the determiner,
   wherein the second controller comprises:
      a detector that detects, with the processor and via the interface, a distance on the screen of the touch panel from a center point of the predefined region to the touched position detected by the touch position detector; and
      a rotation angle controller that controls, with the processor, a rotation angle of the virtual camera depending on the distance detected by the detector.

2. The image generation apparatus as claimed in claim 1, wherein the first controller determines a movement amount based on a preset coefficient depending on one of a kind of place and a situation where the player character is located, and moves the virtual camera along the predefined direction of the line of sight by the movement amount.

3. The image generation apparatus as claimed in claim 1, wherein the predefined region is a central region of the screen.

4. The image generation apparatus as claimed in claim 1, wherein the predefined region is a central region of the screen and is circular.

5. The image generation apparatus as claimed in claim 1, wherein the predefined region is set in a central region of the screen and hidden from a view of a user on the screen, and
   wherein the determiner determines whether a time period of a touch on the screen detected by the touch position detector is longer than a predefined time period, and, when the time period of the touch is longer than the predefined time period, determines whether the touched position is within the predefined region on the screen.

6. A non-transitory computer readable medium that stores an image generation program executed by a computer of an image generation apparatus that sets a virtual camera at a viewpoint position of a player character in a virtual three-dimensional space where at least one object, including the player character, is set and the player character moves in accordance with a user's operation of an inputter and generates a virtual three-dimensional spatial image viewed from the virtual camera in a predefined direction of a line of sight to display the three-dimensional spatial image on a screen of a touch panel, the program causing the computer to function as:
   a touch position detector that detects a touched position on the screen of the touch panel per frame;
   a determiner that determines whether the touched position detected by the touched position detector is within a predefined region on the screen of the touch panel;
   a first controller that moves the virtual camera along the predefined direction of the line of sight in the virtual three-dimensional space when the touched position is determined to be within the predefined region by the determiner; and
   a second controller that rotates the predefined direction of the line of sight depending on the touched position in the virtual three-dimensional space by detecting a distance on the screen of the touch panel from a center point of the predefined region to the touched position detected by the touch position detector and controlling a rotation angle of the virtual camera depending on the detected distance when the touched position is determined to be outside the predefined region by the determiner.

7. An image generation method that sets a virtual camera at a viewpoint position of a player character in a virtual three-dimensional space where at least one object, including the player character, is set and the player character moves in accordance with a user's operation of an inputter, and generates a virtual three-dimensional spatial image from the virtual camera in a predefined direction of a line of sight to display the three-dimensional spatial image on a screen of a touch panel by a computer, the method comprising:
   detecting, by the computer, a touched position on the screen of the touch panel per frame;
   determining, by the computer, whether the touched position detected on the screen of the touch panel is within a predefined region on the screen of the touch panel;
   moving, by the computer, the virtual camera along the predefined direction of the line of sight in the virtual three-dimensional space when the touched position is determined to be within the predefined region;
   rotating, by the computer, the predefined direction of the line of sight depending on the touched position in the virtual three-dimensional space when the touched position is determined to be outside the predefined region;
   detecting a distance on the screen of the touch panel from a center point of the predefined region to the touched position detected on the screen of the touch panel;
   controlling a rotation angle of the virtual camera depending on the distance detected on the screen of the touch panel.

8. The image generation apparatus as claimed in claim 2, wherein the situation of the player character is such that the player character one of runs and walks.

9. The image generation apparatus as claimed in claim 1, further comprising:
   a floor determiner that determines a floor of the virtual three-dimensional spatial image; and
   a shape changer that changes a shape of the predefined region depending on a determination result by the floor determiner.

10. The non-transitory computer readable medium as claimed in claim 6,
   wherein the first controller determines a movement amount based on a preset coefficient depending on one of a kind of place and a situation where the player character is located, and moves the virtual camera along the predefined direction of the line of sight by the movement amount.

11. The non-transitory computer readable medium as claimed in claim 10,
wherein the situation of the player character is such that the player character one of runs and walks.

12. The non-transitory computer readable medium as claimed in claim 6,
wherein the predefined region is a central region of the screen.

13. The non-transitory computer readable medium as claimed in claim 6,
wherein the predefined region is a central region of the screen and is circular.

14. The non-transitory computer readable medium as claimed in claim 6,
wherein the determiner determines whether a time period of a touch on the screen of the touch panel detected by the touch position detector is longer than a predefined time period, and, when the time period of the touch is longer than the predefined time period, determines whether the touched position is within the predefined region on the screen of the touch panel.

15. The non-transitory computer readable medium as claimed in claim 6, further comprising:
a floor determiner that determines a floor of the virtual three-dimensional spatial image; and
a shape changer that changes a shape of the predefined region depending on a determination result by the floor determiner.

16. The image generation method as claimed in claim 7, further comprising:
determining a movement amount based on a preset coefficient depending on one of a kind of place and a situation where the player character is located,
wherein the virtual camera is moved along the predefined direction of the line of sight by the movement amount.

17. The image generation method as claimed in claim 7,
wherein the predefined region is a central region of the screen.

18. The image generation method as claimed in claim 7,
wherein the predefined region is a central region of the screen and is circular.

19. The image generation method as claimed in claim 7, further comprising:
determining whether a time period of a touch on the screen of the touch panel is longer than a predefined time period; and
when the time period of the touch is longer than the predefined time period, determining whether the touched position is within the predefined region on the screen of the touch panel.

20. The image generation method as claimed in claim 7, further comprising:
determining a floor of the virtual three-dimensional spatial image; and
changing a shape of the predefined region depending on a determination result by the floor determiner.

* * * * *